Nov. 3, 1936. J. ROUFFAER 2,059,492
FUSELAGE
Filed April 9, 1934
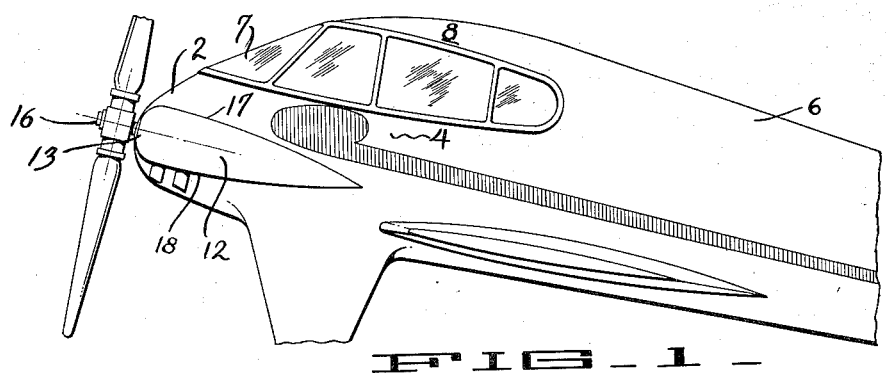
FIG_1_
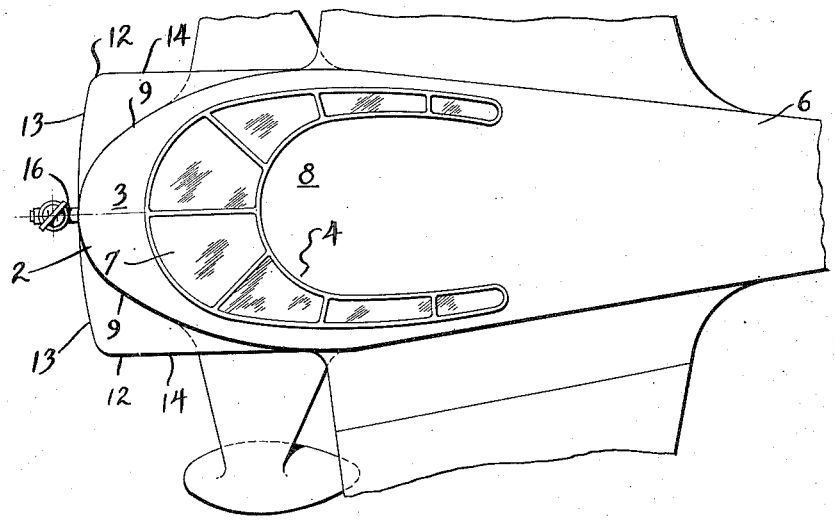
FIG_2_
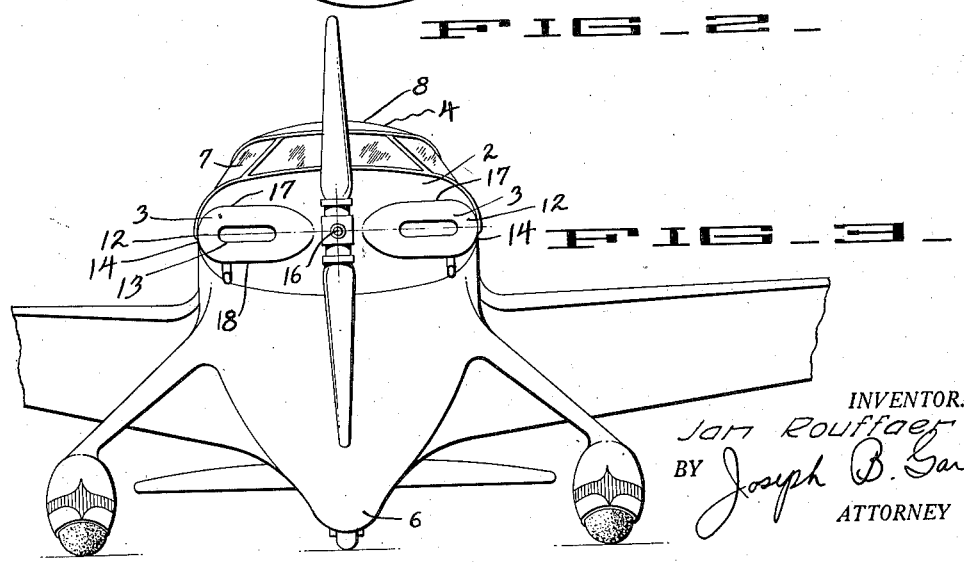
FIG_3_
INVENTOR.
Jan Rouffaer
BY Joseph B. Gardner
ATTORNEY Patented Nov. 3, 1936

2,059,492

UNITED STATES PATENT OFFICE 2,059,492

FUSELAGE

Jan Rouffaer, Oakland, Calif.

Application April 9, 1934, Serial No. 719,655

1 Claim. (Cl. 244—30)

The invention relates to a fuselage for an airplane, and particularly to the design and relation of the enclosure portions at the front of the fuselage, including those of the power plant.

An object of the invention is to provide a fuselage in which the enclosure for the power plant will combine with the cowling and covering for the front portions of the fuselage to provide a full streamline frontal unit.

Another object of the invention is to provide a streamline lead for the fuselage, which will embrace as a unitary part thereof an enclosure for a power plant having portions extending appreciably laterally from the longitudinal axis of the fuselage.

A further object of the invention is to arrange the power plant and the enclosure therefor in such relation to the fuselage nose that the enclosure may be merged with the front covering and cowling of the fuselage in surfaces affording exceeding grace and harmony of design as well as a minimum fluid resistance to the forward advance of the unit.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a side elevation of an airplane fuselage designed in accordance with my invention, parts of the plane being broken away to reduce the size of the figure.

Figure 2 is a plan view of the plane as shown in Figure 1.

Figure 3 is a front end view of the plane.

As above explained, the design and arrangement of the fuselage unit of my invention is particularly applicable for use with a power plant where portions thereof lie laterally of the fuselage nose. Such an arrangement may occur with many types of conventional plants. For instance where twin units are utilized, each may lie at opposite sides of and with the axis parallel to the longitudinal axis of the fuselage. Again the plant may be in the form of an engine with one or more sets of opposed cylinders, each cylinder of a set being in opposed relation to the other and perpendicular to the said axis of the fuselage. I have found that by arranging the plant such as described, with the leading side substantially coterminous with the leading edge of the fuselage nose, and with the lateral extension of the plant from the axis of the fuselage approximately equal to the distance between such axis and the side of the fuselage at or near its greatest width, an enclosure may be formed for such plant, and the enclosure can be merged with the covering and cowling of the nose and cockpit portion of the fuselage with lines which will insure beauty of contour and streamline passage of fluid past practically all of the leading surfaces of the fuselage unit. More exactly, it may be stated that the relationship aforesaid is desired with respect to the external dimensions of the plant enclosure rather than the plant itself, but it will be clear that while such dimensions of the plant enclosure necessarily involve smaller over-all dimensions of the plant, there is still ample space within such enclosures and the fuselage body proper to house a plant of any reasonable power desired.

In the embodiment of the invention illustrated, the portion of the fuselage embracing the front end 2, the cowling 3, the cockpit 4, and the rearward body portion 6, is to a large extent of the conventional form, and preferably a desired effect is carried out by including the windshield 7, the cowling 3, and cockpit cabin roof 8, as a streamlined unit. As will be clear from Figures 2 and 3, there is provided at opposite sides 9 of the front portion of the fuselage, horizontally aligned enclosure portions 12 each of which serves to house a portion or unit of the power plant of the plane. Each enclosure 12 has its leading face 13 preferably exactly coterminous with the leading end 2 of the fuselage and recedes somewhat therefrom as it progresses to its side face 14. In vertical dimension the enclosure, in conformity with the power plant portion therein, extends a distance equally upwardly and downwardly from the axis of the propeller shaft 16, or of the main body of the fuselage, and such dimension thereof as defined by the upper and lower sides 17 and 18 of the enclosures is carried through substantially to the point of juncture with the walls of said main body of the fuselage. Where the rear extremity of the power plant terminates or is otherwise reduced in height at an appreciable distance forwardly of the rear terminus of the side face 14, the distance between the upper and lower sides 17 and 18, and the vertical dimension of the side 13, is gradually foreshortened as said face and sides approach the rear end of the face. In a case where the power plant extends back considerably from the front line of the fuselage, such as when twin motors with relatively large over-all lengths are used, or when sets of opposed cylinders are duplicated back of the set at the face of the enclosure, the sides 17 and 18 may continue in parallel relation, and the face 14 extends for its leading height, up to the fuselage body. If desired, particularly in the latter cases, the surfaces 17 and 18 and the face 14 may be allowed to diverge somewhat as they approach their rear extremities.

By reference to Figure 2, it will be observed that the general distance between the faces 14 of the two enclosure portions is approximately equal to, and such faces meet the main body portion of the fuselage, at the widest portion of the latter, which in the instance illustrated is at the cockpit 4. With such an arrangement practically no eddy currents will be created at any point along said faces or at the juncture thereof with the fuselage main body. Furthermore, owing to the smooth and uninterrupted surface of the sides 17 and 18, and the substantial lack of any lead face thereon, a corresponding omission of wind resistance and eddying will be provided thereby. Preferably the frontal or leading face 13 of the enclosures curves rearwardly as it recedes in opposite vertical directions from the horizontal line intersecting the fuselage or propeller shaft axis.

It will now be clear that the enclosure portions will be effectively combined with the main fuselage body in enclosing the power plant in a manner adding to the grace of the plane and reducing to a minimum the wind resistance set up thereby on the advance movement thereof.

I claim:

A cabin type airplane comprising, a body having a relatively small frontal area and being enlarged rearwardly in a substantially streamlined spheroid widening along continuous curves to an intermediate portion including the cabin and then converging in the direction of the tail, a frontal casing extending transversely of said spheroid at the extreme front thereof to house a motor of a transverse dimension greater than the transverse dimension of the spheroid at and adjacent to the front thereof, said casing being extended transversely into substantial longitudinal alignment with the sides of said intermediate portion of said spheroid and extended rearwardly at the ends of the casing to said sides, said casing being curved in a vertical longitudinal plane to define substantially streamlined top and bottom sides which join with the sides of said spheroid intermediate said widest portion and the front end thereof.

JAN ROUFFAER.